United States Patent

Huggler

[11] Patent Number: 6,104,001
[45] Date of Patent: Aug. 15, 2000

[54] SPRINGLESS ADJUSTABLE BREAD GUARD, AND HEATING APPLIANCE INCLUDING SAME

[75] Inventor: Peter Huggler, Columbia, Mo.

[73] Assignee: Salton, Inc., Mount Prospect, Ill.

[21] Appl. No.: 09/318,526

[22] Filed: May 25, 1999

[51] Int. Cl.[7] ...................................................... F24C 7/10
[52] U.S. Cl. ........................... 219/386; 219/521; 99/393; 99/391
[58] Field of Search ..................................... 219/385, 386, 219/387, 521; 99/385, 389, 390, 391, 392, 393, 394, 395, 396, 399, 400, 401

[56] References Cited

U.S. PATENT DOCUMENTS

| | | | |
|---|---|---|---|
| 2,778,912 | 1/1957 | Palmer et al. | 99/389 |
| 2,779,849 | 1/1957 | Gomersall | 99/389 |
| 2,847,931 | 8/1958 | Saint | 99/389 |
| 4,038,520 | 7/1977 | Boller et al. | 219/521 |
| 4,216,372 | 8/1980 | Huggler | 219/521 |
| 4,645,909 | 2/1987 | Thoben et al. | 219/385 |
| 5,193,439 | 3/1993 | Finesman et al. | 99/391 |
| 5,385,082 | 1/1995 | Huggler | 99/385 |
| 5,528,980 | 6/1996 | McClean | 99/391 |
| 5,653,158 | 8/1997 | Balandier et al. | 219/521 |
| 5,664,481 | 9/1997 | Huggler | 99/389 |
| 5,735,191 | 4/1998 | Russell et al. | 99/393 |
| 5,746,115 | 5/1998 | Yip | 99/391 |
| 5,947,006 | 9/1999 | Mauffrey | 99/391 |

Primary Examiner—Teresa Walberg
Assistant Examiner—Fadi H. Dahbour
Attorney, Agent, or Firm—Dorsey & Whitney LLP

[57] ABSTRACT

A springless adjustable bread guard for a heating appliance requires no springs for returning the guard to a desired position. The heating appliance includes a fixed structure relative to the bread guard, and the bread guard includes a resilient bread guard arm having a longitudinal axis and at least one cross member. Each cross member is attached to the bread guard arm spaced apart from a first end of the cross member and at a point along the longitudinal axis of the bread guard arm. The bread guard arm is attached to the fixed structure to rotate about the longitudinal axis. The bread guard operates responsive to a force applied to the arm to rotate a first direction about the longitudinal axis so that one of the cross members contacts a portion of the fixed structure and thereby applies a force to the cross member that causes the arm to bow placing the bread guard in an inward position. The bread guard operates when the applied force is removed to rotate a second direction about the longitudinal axis to an outward position responsive solely to a return force generated by the bowed bread guard arm.

28 Claims, 6 Drawing Sheets

SPRINGLESS ADJUSTABLE BREAD GUARD, AND HEATING APPLIANCE INCLUDING SAME

TECHNICAL FIELD

The present invention relates generally to heating appliances such as toasters or toaster ovens, and more specifically, to a bread guard for positioning a food item in a bread cavity during heating of the food item.

BACKGROUND OF THE INVENTION

A conventional heating appliance, such as a toaster or toaster oven, typically includes a plurality of bread guards positioned within a cooking cavity of the appliance. Each of the bread guards is positioned adjacent a corresponding heating element that generates heat to cook a food item placed within the cooking cavity during operation of the toaster. The bread guards function to prevent a food item placed in the toaster from directly contacting the heating elements. In many conventional toasters, the bread guards are also movable, and function to both prevent contact with the heating elements and to position the food item within the cooking cavity for optimum cooking.

FIG. 1 is an isometric view of a conventional toaster 400 with its external housing (not shown) removed to better illustrate a shell 300 including two side panels 302, 304, a rear panel 306, and two front sub panels 316 and 318. The panels 302–306 and 316, 318 may be separate components that are joined by suitable means, or the shell 300 may be a unitary structure. The toaster 400 includes first and second outer heating elements 402, 404 positioned inside the side panels 302 and 304, respectively. The heating elements 402, 404 include respective first electrical terminals 406, 408 extending through apertures 319, 321 in the front sub panels 316, 318, and respective second electrical terminals 410, 411 extending above a top edge of the rear panel 306. Each of the electrical terminals 406–411 is adapted to receive a respective power signal that is applied to circuitry (not shown) on the heating element 402, 404 to generate heat for toasting food items.

The toaster 400 further includes a movable outer bread guard 418 positioned inside the outer heating element 402, and a similar movable outer bread guard 420 positioned inside the outer heating element 404. The outer bread guard 418 includes a lower arm 422 having a front end that extends through a hook 324 in the sub panel 316 and a rear end that extends through a hole 427 in the rear panel 306 to thereby position the outer bread guard 418 in place. The outer bread guard 420 includes a lower arm 423 that is positioned in the same way through a hook 325 in the sub panel 318 and a hole (not shown) in the rear end panel 306. Each of the bread guards 418, 420 further includes an upper arm 419 and vertical members 421 as shown for the bread guard 418. A bottom bracket 426 is attached to the bottom of the front sub panels 316, 318 to secure each of the arms 422, 423 in the corresponding hooks 324, 325 as shown, and thereby secure the bread guards 418, 420 in place. A spring (not shown) is coupled between the lower arms 422, 423 and functions to move the outer bread guards 418, 420 to their desired positions during operation of the toaster 400, as will be described in more detail below.

A center heating element 412 is positioned between the outer heating elements 402 and 404, and includes a pair of terminals 414 that extend through an aperture in the rear panel 306. Two stationary inner bread guards 434 and 436 are positioned on respective sides of the center heating element 412. Each of the inner bread guards 434 and 436 is attached at its rear end through a corresponding tab on the rear panel 306, and is attached at its front end through a corresponding tab on a carriage support bracket 438 positioned between the front sub panels 316 and 318 and a tab on the bottom bracket 426. The toaster 400 further includes an electronic circuit 428 mounted on the horizontal portion of the bottom bracket 426. Although not shown in FIG. 1, the electronic circuit 428 is coupled to the terminals 406–411 and 414 of the heating elements 402, 404, and 412, and operates to control the toaster 400 during operation.

In the toaster 400, a first bread cavity 440 is defined between the bread guards 418 and 434, and a second bread cavity 442 is defined between the bread guards 420 and 436. A first bread tray (not shown) is contained within the first bread cavity 440 and functions to support a piece of bread as it is lowered into and raised from the bread cavity 440. A second bread tray (not shown) is similarly positioned within the second bread cavity 442 to support another piece of bread in the bread cavity 442. Each of the bread trays includes a lever 444 extending through slots 446 and 448, respectively, formed between the carriage support bracket 438 and the sub panels 318 and 316, respectively. The carriage support bracket 438 has a hole 439 adapted to receive a vertical rod (not shown). A bread carriage (not shown) is attached to the levers 444, and slides along the vertical rod to raise and lower the bread trays.

The operation of the movable bread guards 418 and 420 during operation of the toaster 400 will now be described in more detail with reference to the schematic diagrams of FIGS. 2A and 2B. FIGS. 2A and 2B schematically depict side views of the outer bread guard arms 418 and 420. A spring 450 is coupled between the lower bread guard arms 422 and 423 and functions to apply a force to these arms to move the bread guards 418 and 420 to a desired position, as will be explained in more detail below. A vertical rod 452 extends through adjacent a center portion of the spring 450, and the rod is mounted between the hole 439 in the carriage support bracket 438 and the bottom bracket 426, as previously described with reference to FIG. 1. A bread carriage 454 is attached to the levers 444, and slides along the rod 452 to raise and lower the bread trays during operation of the toaster 400. A first stop 456 is formed on the side panel 302 and a second stop 458 is formed on the side panel 304. The stops 456, 458 limit the inward movement of the bread guards 418, 420, as will be described in more detail below.

FIG. 2A depicts the bread carriage 454 and bread guards 418 and 420 when the toaster 400 is OFF and a return force $F_R$ is applied to the bread carriage 454 by, for example, a spring (not shown), causing the bread carriage 454 to slide towards the top of the rod 452. In this situation, the center portion of the spring 450 extends upward, and the spring 450 applies respective outward bias forces $F_{OUT}$ to the lower bread guard arms 422 and 423, thereby placing the bread guards 418 and 420 in their outward positions. Thus, in FIG. 2A, the bread carriage 454 is positioned near the top of the rod 452 and the bread guards 418 and 420 are positioned outward in anticipation of food items being placed on the bread supports and initiation of a heating cycle of the toaster 400.

FIG. 2B illustrates the bread carriage 454, spring 450, and bread guards 418 and 420 during a heating cycle of the toaster 400. To initiate a heating cycle, an external force is applied to the bread carriage 454, sliding the bread carriage toward the bottom of the rod 452. As the bread carriage 454 slides towards the bottom of the rod 452, it contacts the spring 450 and applies a force to the spring. In response to this force, the spring 450 flattens out as shown in FIG. 2B. As the spring 450 flattens out and moves from its position in FIG. 2A to that in FIG. 2B, it applies inward bias forces $F_{IN}$ to the lower bread guard arms 422 and 423. In response to the inward bias forces $F_{IN}$, the bread guards 418 and 420 rotate about the axes of the arms 422, 423 to their inward positions. During a heating cycle, the bread carriage 454 is retained in its downward position by a retaining mechanism (not shown). Upon termination of a heating cycle, the retaining mechanism releases the bread carriage 454, which thereafter slides towards the top of the rod 452 in response to the return force $F_R$ as shown in FIG. 2A. When the bread carriage 454 slides upward, the spring 450 once again returns to its position shown in FIG. 2A thereby applying the forces $F_{OUT}$ to the bread guards 418 and 420 to place the bread guards in their outward position in anticipation of a subsequent heating cycle. The stops 456 and 458 prevent the bread guards 418 and 420 from rotating too far inward so that a food item may not inadvertently be placed directly against a heating element on the wrong side of one of the guards 418 and 420.

In the conventional toaster 400, each toaster must include the spring 450 coupled between the bread guard arms 422 and 423 in order to properly position the bread guards 418 and 420. As a result, each of the conventional toasters 400 must include at least one spring 450 to control the movable bread guards 418 and 420. The spring 450 can take many forms and may be attached to the bread guards in many different ways, as will be understood by those skilled in the art. Each spring 450 increases the cost of the toaster 400 due to the cost of the spring itself plus the labor required for installing the spring. As understood by those skilled in the art, the manufacturing volumes of conventional toasters may be very large, and thus the cost of the spring and the associated labor may result in the expenditures of large sums of money.

There is a need for a movable bread guard in the heating appliance that reduces the cost of and simplifies the installation of the bread guard to thereby reduce the overall cost of the appliance.

SUMMARY OF THE INVENTION

According to one aspect of the present invention, an adjustable bread guard for a heating appliance requires no springs for returning the guard to a desired position. The heating appliance includes a fixed structure relative to the bread guard, and the bread guard includes a resilient bread guard arm having a longitudinal axis and at least one cross member. Each cross member is attached to the bread guard arm spaced apart from a first end of the cross member and at a point along the longitudinal axis of the bread guard arm. The bread guard arm is attached to the fixed structure to rotate about the longitudinal axis. The bread guard operates responsive to a force applied to the arm to rotate a first direction about the longitudinal axis so that one of the cross members contacts a portion of the fixed structure and thereby applies a force to the cross member that causes the arm to bow while placing the bread guard in an inward position. The bread guard operates when the applied force is removed to rotate a second direction about the longitudinal axis to an outward position responsive solely to a return force generated by the bowed bread guard arm.

DETAILED DESCRIPTION OF THE INVENTION

Figure 2A:
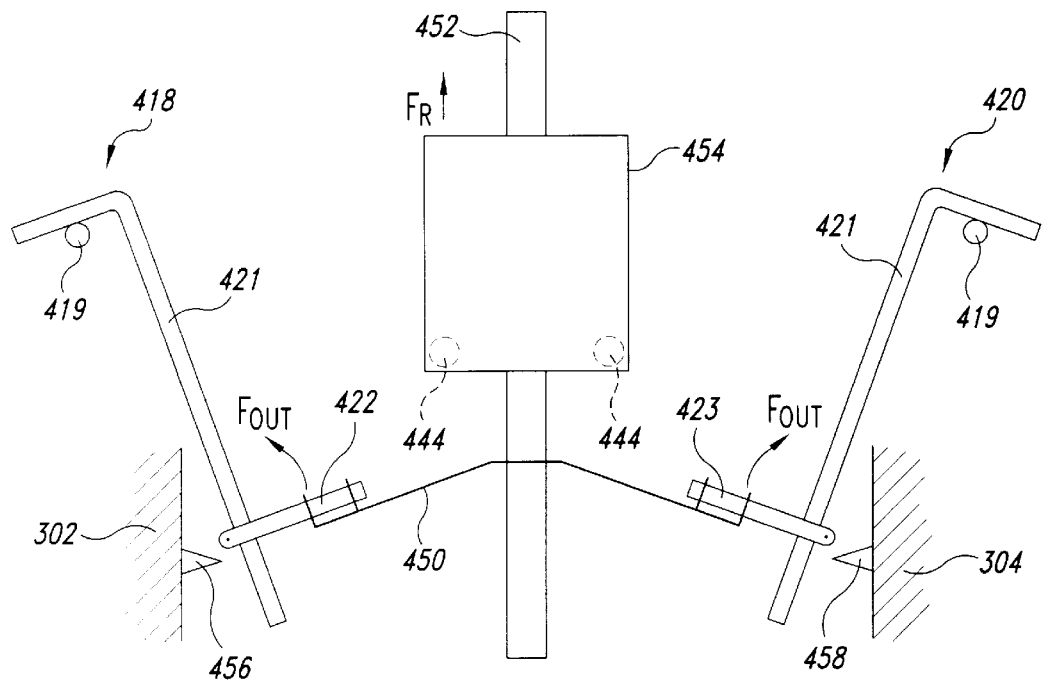
FIG. 2 is a schematic diagram illustrating the operation of the bread guards of FIG. 1 during a heating cycle of the toaster.
Figure 2B:
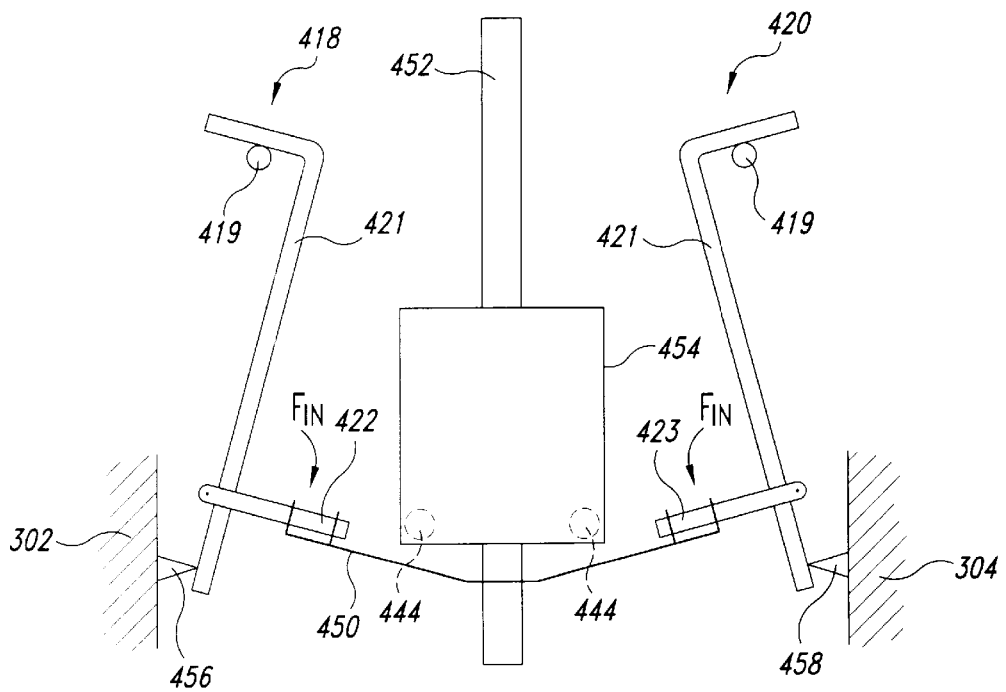
Figure 3:
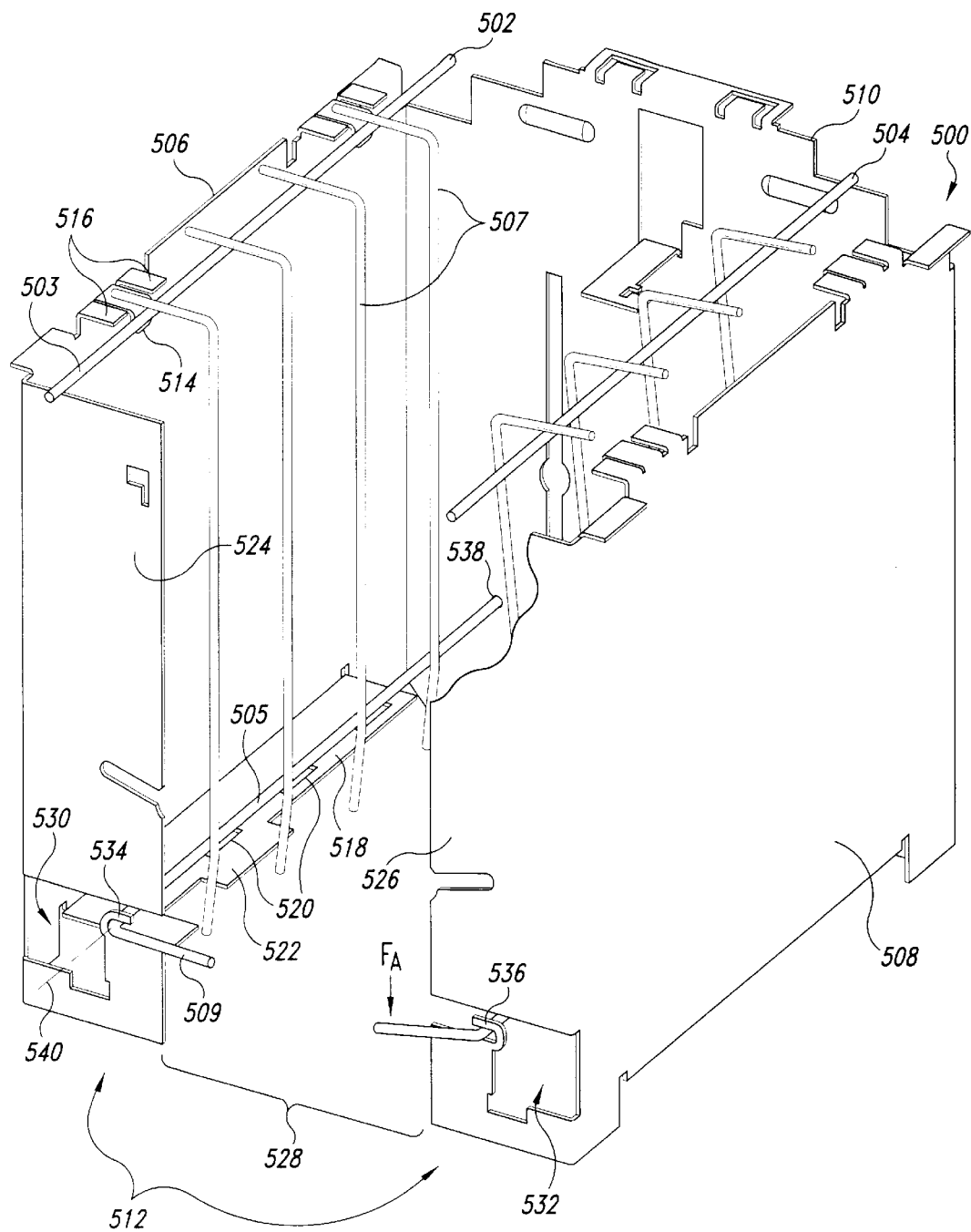
FIG. 3 is an isometric view of a toaster shell including a springless bread guard according to one embodiment of the present invention.

FIG. 3 is an isometric view of a toaster shell 500 including adjustable outer bread guards 502 and 504 according to one embodiment of the present invention. The bread guards 502 and 504 are similar, and thus for the sake of brevity only the bread guard 502 will be described in more detail. In operation, the bread guards 502 and 504 move inward (as shown for bread guard 504) during a heating cycle of the toaster and return to an outward position (as shown for the bread guard 502) without the need for a biasing spring as previously described with reference to FIGS. 2A and 2B, as will be explained in more detail below.

In the embodiment of FIG. 3, the shell 500 is a unitary shell including two side panels 506 and 508, a rear panel 510, and a front panel 512. The side panels 506 and 508 each include a pair of upper side tabs 514 with spacers 516 being formed on both sides of each side tab. The tabs 514 function to secure a heating element (not shown) to the corresponding side panel 506, 508, as will be described in more detail below. Each of the side panels 506 and 508 further includes a horizontal panel 518 formed along its bottom edge. Each horizontal panel 518 includes a plurality of slots 520, each slot adapted to receive a tab from a corresponding heating element (not shown). Each horizontal panel 518 further includes a biasing projection 522 extending from an inner edge of the horizontal panel. The biasing projection 522 functions to apply a force to the corresponding bread guard 502, 504 that moves the bread guard to its outer position, as will be described in more detail below.

In the shell 500, the front panel 512 includes a left subpanel 524 and right subpanel 526. An opening 528 is formed between vertical edges of the subpanels 524, 526 to allow the outer bread guards 502, 504 and other components to be inserted inside the shell 500 during construction of the toaster. Each of the subpanels 524, 526 includes a respective aperture 530, 532 that extends to the vertical edge of the subpanel. The apertures 530, 532 receive a terminal (not shown) of a heating element being secured to the adjoining side panel 506, 508. A hook 534, 536 is formed adjoining the apertures 530, 532 and receives a portion of the outer bread guards 502, 504, as will be described in more detail below.

The outer bread guard 502 includes an upper bread guard arm 503, a resilient lower bread guard arm 505, and a plurality of vertical members 507 attached between the arms. At least one of the vertical members includes a portion extending beyond the lower bread guard arm 505 adjacent the biasing projection 522. The lower resilient bread guard arm 505 has a rear end inserted through a hole 538 in the rear panel 510, and has its front end inserted in the hook 534. The front end of the arm 505 is bent to form a lever 509 that extends outside the subpanel 524. The arm 505 is secured in the hook 534 by a bottom bracket (not shown), as will be described in more detail below. The long portion of the arm 505 extending between the rear panel 510 and the hook 534 has a longitudinal axis as indicated by the dotted line 540.

Figure 4A:
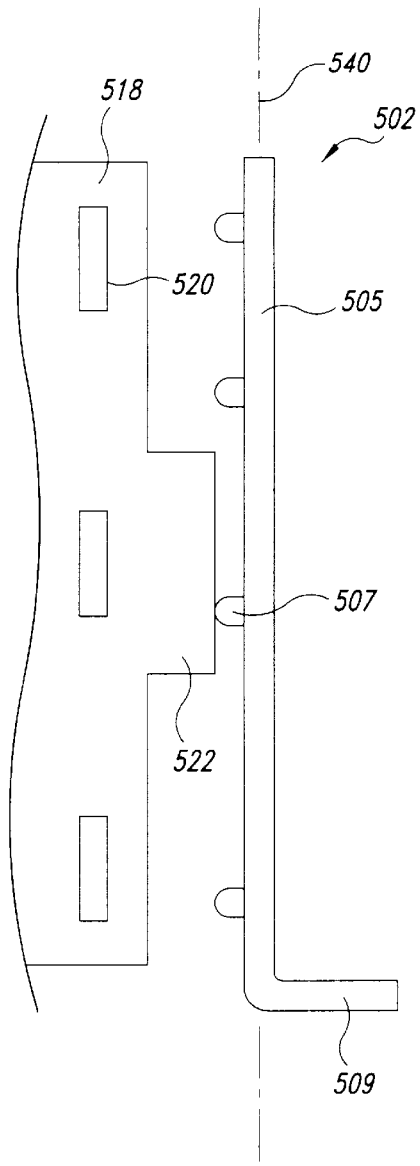
FIGS. 4A and 4B are schematic diagrams further illustrating operation of the springless adjustable bread guards of FIG. 3.
Figure 4B:
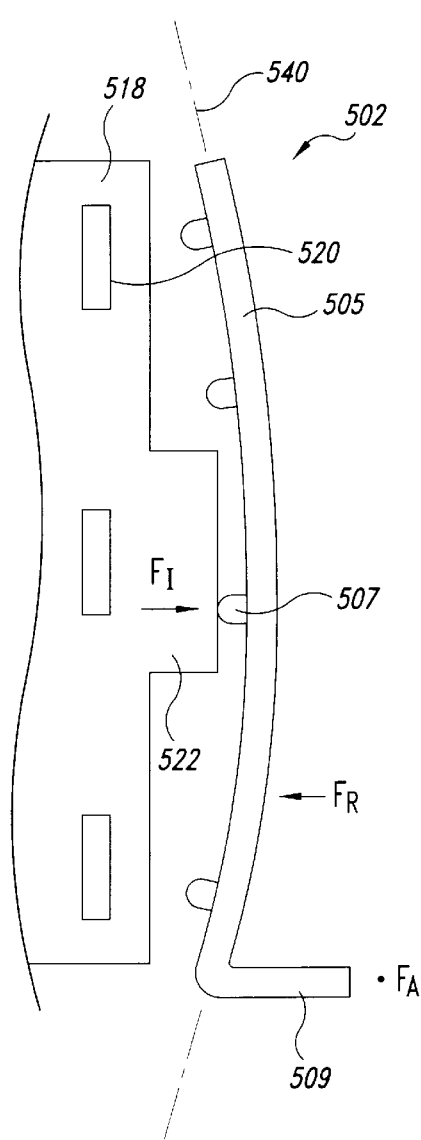

The operation of the movable bread guard 502 will now be described in more detail with reference to the schematic diagrams of FIGS. 4A–4B and 5A–5B. FIGS. 4A and 4B are schematic top views of the resilient lower bread guard arm 505 and adjacent horizontal panel 518. FIG. 4A depicts the arm 505 when no force is applied to the lever 509 and the bread guard 502 is positioned outward as shown in FIG. 3. In FIG. 4B, an activation force $F_A$ is applied to the lever 509 causing the arm 505 to rotate about the longitudinal axis 540. The activation force $F_A$ is applied to the lever 509 during a heating cycle of the toaster. As the arm 505 rotates about the axis 540, the vertical member 507 contacts the biasing projection 522 causing an inward force $F_I$ to be exerted against the vertical member 507, and this force is, in turn, applied to the resilient bread guard arm 505. In response to the force $F_I$, the resilient bread guard arm 505 bows inwardly as shown in FIG. 4B. At this point, the upper arm 503 (not shown in FIG. 4A) has moved to its inward position as illustrated for the bread guard 504 in FIG. 3. Thus, when the bread guard 502 is in the inward position, the resilient bread guard arm 505 is bowed as shown in FIG. 4B. Upon termination of the heating cycle, the activation force $F_A$ is removed and the bread guard 502 returns to its outward position as shown in FIG. 4A due to a return force $F_R$ generated by the bowed resilient bread guard arm 505.

Figure 1:
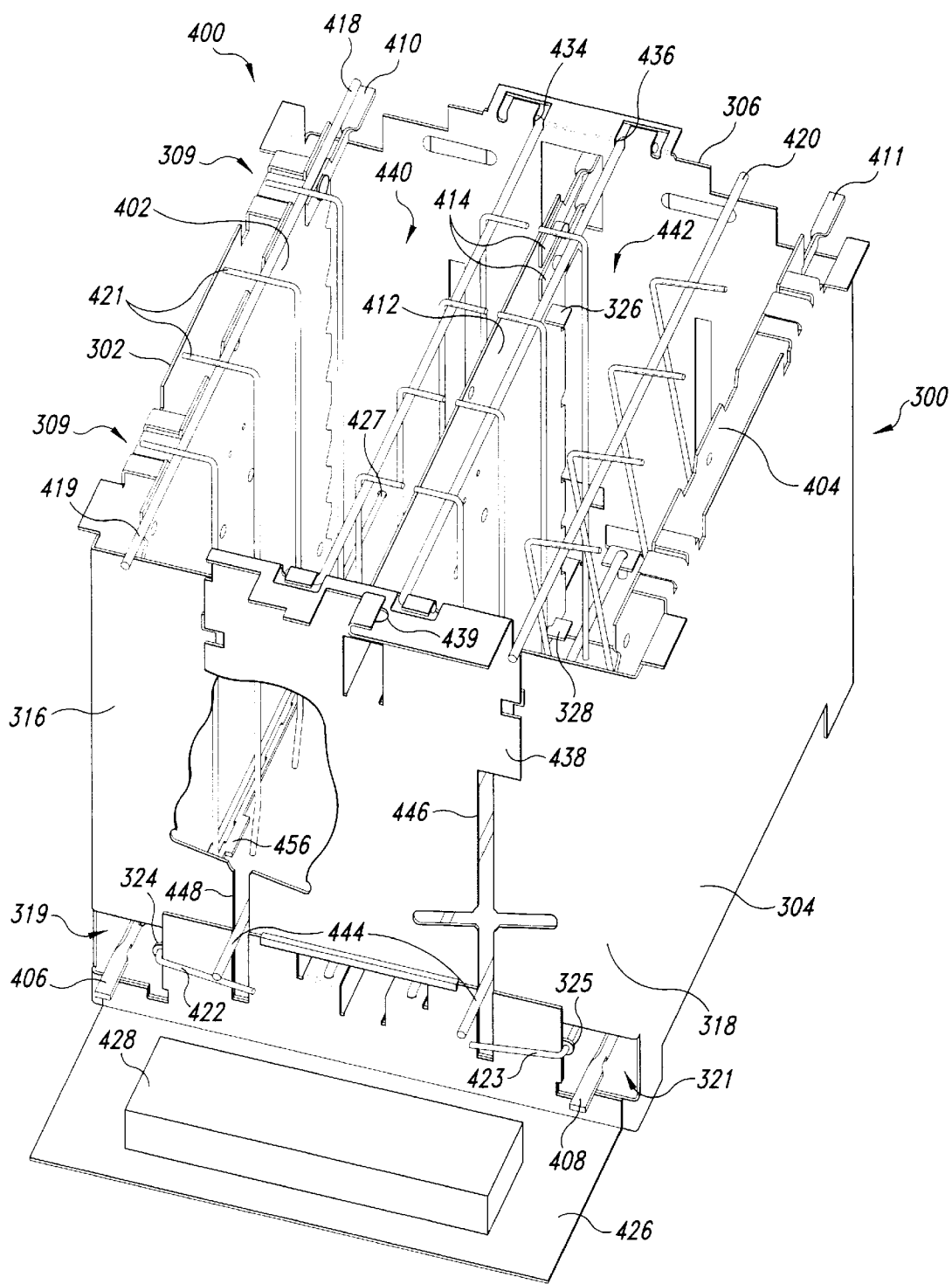
FIGS. 1 is an isometric view of a conventional toaster including conventional movable bread guards.

With the bread guard 502, no spring 450, as previously described with reference to FIGS. 2A and 2B, is required to control the position of the bread guard. In contrast, the bread guard 502 automatically returns to its outward position upon the activation force $F_A$ being removed due to the return force $F_R$ generated by the bowed resilient bread guard arm 505. The resilient bread guard arm 505 must be formed from a material having the required resilient characteristics. Moreover, the arm 505 must also have a diameter that allows the arm to bow in response to the inward force $F_I$. If the arm 505 has too large a diameter, the required activation force $F_A$ to bow the arm 505 may become too large. For example, in the conventional bread guard arm 418 previously described with reference to FIGS. 1 and 2A–2B, the lower bread guard arm 422 has a relatively large diameter compared to the arm 505, and thus the arm 422 does not bow during operation of the conventional bread guard 418.

It should also be noted that the biasing projection 522 functions to contact the vertical member 507 and thereby apply the inward force $F_I$ to the arm 505 upon application of the activation force $F_A$. Thus, the projection 522 must be spaced sufficiently close to the vertical member 507 so that when the resilient arm 505 returns to its "unbowed" state, the adjacent member 507 guard 502 is positioned in its desired outward position. The projection 522 may contact the adjacent member 507 when the guard 502 is in its outward position. Thus, although the biasing projection 522 appears similar to the stops 456 and 458 shown in FIGS. 2A and 2B, the function of these two components is very different. The stops 456 and 458 function to prevent the conventional bread guards 418 and 420 from rotating too far inward as previously described. Thus, the stops 456 and 458 cannot be positioned too close to the adjacent vertical member 421 of the guards 418 and 420 or else the bread guards could not rotate to their desired inward position. In contrast, the function of the biasing projection 522 is to contact the adjacent vertical member 507 so that the inward force $F_I$ bows the arm 505. This projection 522 does not function to limit the inward position of the bread guard 502 as do the stops 456 and 458.

Figure 5A:
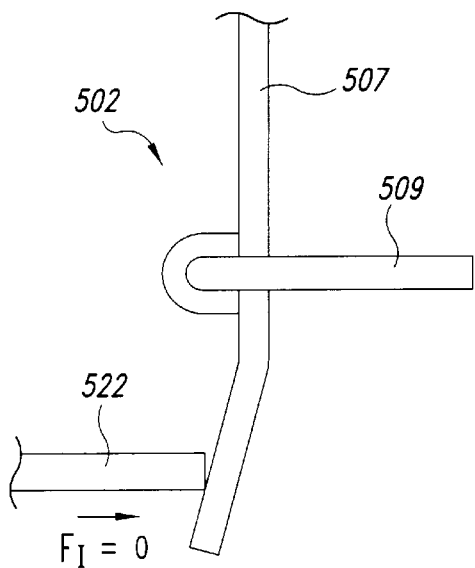
FIGS. 5A and 5B are schematic diagrams further illustrating operation of the adjustable bread guards of FIG. 3.
Figure 5B:
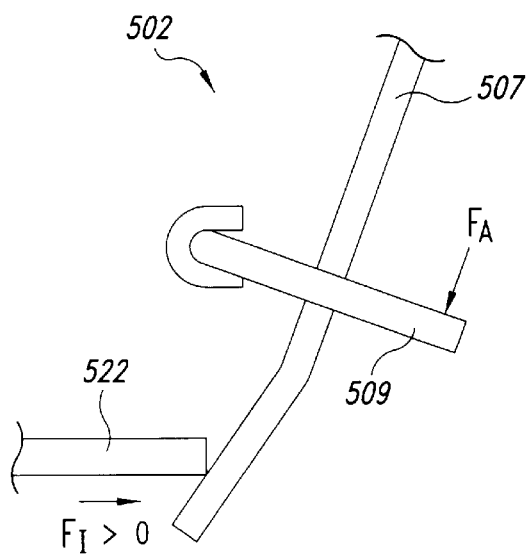

FIGS. 5A and 5B are schematic side views of the lever 509 of the resilient bread guard arm 505 and the vertical member 507 adjacent the projection 522. In FIG. 5A, no actuation force $F_A$ is applied to the lever 509 of so the inward force $F_I$ is zero and the bread guard 502 is in the outward position. In FIG. 5B, the actuation force $F_A$ is applied to the lever 509, causing the inward force $F_I$ to be exerted against the member 507. In response to the forces $F_A$ and $F_I$, the resilient arm 505 (not shown) bows and the guard 502 moves to its inward position, as previously described.

FIG. 5B illustrates that as the arm 565 bows, the member 507 moves inward relative to the end of the lever 509 that rotates about the axis 540.

Figure 6:
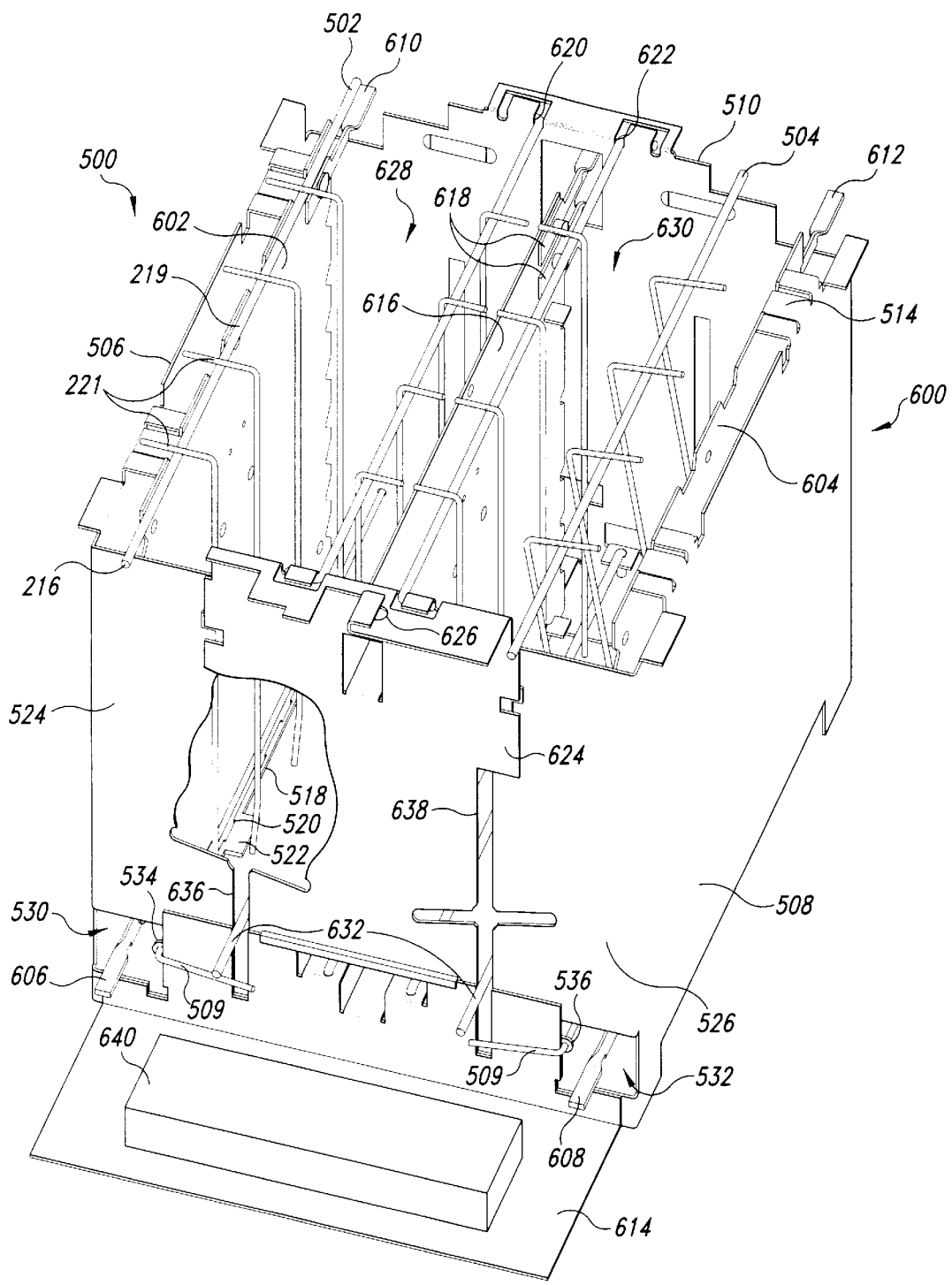
FIG. 6 is an isometric view of a toaster including the shell and bread guard of FIG. 3.

FIG. 6 is an isometric view of one embodiment of a toaster 600 with its external housing (not shown) removed to better illustrate the shell 500 and bread guards 502 and 504, along with a plurality of components 602–640 that correspond to similar components previously described with reference to FIG. 1. In the toaster 600, the components 602–640 perform the same function as corresponding components previously described with reference to the conventional toaster 400 of FIG. 1, and thus, for the sake of brevity, these components will not be described in more detail. The toaster 600 includes an electronic circuit 640 that controls operation during heating cycles. The specific operation of the electronic circuit 640 and overall operation of the toaster 600 will be well understood by those skilled in the art, and thus for the sake of brevity will not be described in more detail. An example of circuitry that may be utilized to form the electronic circuit 640 is described in U.S. patent application Ser. No. 09/307,074 to Lile, filed on May 7, 1999, which is incorporated herein by reference.

The operation of the bread guards 502 and 504 during operation of the toaster 600 will now be briefly, described. To initiate a heating cycle, an external force is applied to push down a bread carriage (not shown) which, in turn, lowers the levers 632 to thereby lower the bread trays. As the levers 632 are lowered in the slots 636 and 638, the levers contact the levers 509 of the bread carriages 502 and 504 thereby applying the activation force $F_A$ to the levers 509. A retaining mechanism (not shown) maintains the bread carriage and thus the levers 632 in their lowered position during a heating cycle of the toaster 600. While in the lowered position, the levers 632 exert the activation force $F_A$ against the levers 509 and thus the bread guards 502 and 504 remain in their inward position as shown for the bread guard 504. At this point, the resilient bread guard arms 505 of the bread guards 502 and 504 are bowed as previously described. Upon termination of the heating cycle, the retaining mechanism releases the bread carriage and an upward force is applied to slide the bread carriage towards the top of the toaster which, in turn, raises the levers 632 and bread trays. As the levers 632 are raised, the activation force $F_A$ is removed from the levers 509 and the bowed resilient bread guard arms 505 of each of these bread guards returns the bread guard to its outward position as shown for the bread guard 502.

It is to be understood that although various embodiments of the present invention have been set forth in the foregoing description, the above disclosure is illustrative only, and changes may be made in detail while remaining within the broad principles of the invention. For example, the number of vertical members 507 may be varied, as may the particular shape, number, size and orientation of the biasing projections 522. For example, the biasing projections 522 could be positioned vertically instead of horizontally. Accordingly, the invention is to be limited only by the appended claims.

What is claimed is:

1. A bread guard for a heating appliance having a fixed structure, the bread guard comprising a resilient bread guard arm having a longitudinal axis and at least one cross member, each cross member being attached to the bread guard arm spaced apart from a first end of the cross member and at a point along the longitudinal axis of the bread guard arm, the bread guard arm being attached to the fixed structure to rotate about the longitudinal axis, the bread guard being operable responsive to a force applied to the arm to rotate a first direction about the longitudinal axis so that one of the cross members contacts a portion of the fixed structure and thereby applies a force to the cross member that causes the arm to bow placing the bread guard in an inward position, and the bread guard being operable when the applied force is removed to rotate a second direction about the longitudinal axis to an outward position responsive solely to a return force generated by the bowed bread guard arm.

2. The bread guard of claim 1 wherein the bread guard arm comprises a rod having the longitudinal axis and having first and second portions, the second portion being shorter than the first portion and being bent so that its longitudinal axis is approximately perpendicular to the longitudinal axis of the first portion.

3. The bread guard of claim 2 wherein the heating appliance further comprises a bread carriage that applies the force directly to the second portion of the bread guard arm.

4. The bread guard of claim 1 wherein the resilient bread guard arm comprises a resilient metal rod.

5. The bread guard of claim 1 wherein the respective cross member contacts the portion of the fixed structure when the bread guard is in the outward position.

6. The bread guard of claim 1 further comprising four cross members, each cross member having top and bottom ends, the resilient bread guard arm being attached to the cross members spaced apart from the bottom ends and the bread guard further comprising a top arm being attached to the cross members spaced apart from the top ends.

7. A bread guard for a heating appliance, the bread guard comprising a plurality of vertical members, each vertical member having a longitudinal axis and a top and a bottom end, and the bread guard further including a top arm having a longitudinal axis and being mounted to each of the vertical members spaced apart from the top end, the longitudinal axis of the top arm being substantially perpendicular to the longitudinal axes of the vertical members, and the bread guard further including a resilient lower bread guard arm having a longitudinal axis and being mounted to each of the vertical members spaced apart from the bottom end, the longitudinal axis of the lower bread guard arm being substantially perpendicular to the longitudinal axes of the vertical members, the resilient lower bread guard arm being operable to generate a bias force to place the bread guard in a desired position within the heating appliance, the bread guard arm generating the sole force placing the bread guard in the desired position.

8. The bread guard of claim 7 wherein the resilient lower bread guard arm comprises a rod having the longitudinal axis and having first and second portions, the second portion being shorter than the first portion and being bent so that its longitudinal axis is approximately perpendicular to the longitudinal axis of the first portion.

9. The bread guard of claim 7 wherein the resilient lower bread guard arm comprises a resilient metal rod.

10. A bread guard for a heating appliance having a shell, the bread guard comprising a resilient bread guard arm having a longitudinal axis and at least one cross member, each cross member being attached to the bread guard arm spaced apart from a first end of the cross member and at a point along the longitudinal axis of the bread guard arm, the bread guard arm being attached to the shell to rotate about the longitudinal axis, the bread guard rotating about the longitudinal axis in a first direction to an inward position responsive to a force applied to the arm, a portion of the shell applying a bias force to one of the cross members that bows the arm when the guard is in the inward position, the bread guard rotating about the longitudinal axis in a second direction to an outward position responsive solely to a return force generated by the bowed bread guard arm when the applied force is removed.

11. The bread guard of claim 10 wherein the bread guard arm comprises a rod having the longitudinal axis and having first and second portions, the second portion being shorter than the first portion and being bent so that its longitudinal axis is approximately perpendicular to the longitudinal axis of the first portion.

12. The bread guard of claim 11 wherein the heating appliance further comprises a bread carriage that applies the force directly to the second portion of the bread guard arm.

13. The bread guard of claim 10 wherein the resilient bread guard arm comprises a resilient metal rod.

14. The bread guard of claim 10 wherein the respective cross member contacts the portion of the fixed structure when the bread guard is in the outward position.

15. The bread guard of claim 10 further comprising four cross members, each cross member having top and bottom ends, the resilient bread guard arm being attached to the cross members spaced apart from the bottom ends and the bread guard further comprising a top arm being attached to the cross members spaced apart from the top ends.

16. An assembly for a heating appliance, comprising:

a shell for a heating appliance comprising first and second side panels and front and rear end panels, the front end panel having first and second sub panels and each sub panel having a vertical edge, the vertical edges of the first and second sub panels being spaced apart to form an opening, and each sub panel including an aperture extending to the corresponding vertical edge;

a first side heating element attached on the inside of the first side panel and including a terminal extending through the aperture in the first sub panel, the first side heating element operable responsive to a power signal being applied on the terminal to generate heat;

a second side heating element attached on the inside of the second side panel and including a terminal extending through the aperture in the second sub panel, the second side heating element operable responsive to a power signal being applied on the terminal to generate heat; and a first bread guard comprising a resilient bread guard arm mounted adjacent the first side panel between the rear end panel and the first sub panel to rotate about a longitudinal axis, and a second bread guard comprising a resilient bread guard arm mounted adjacent the second side panel between the read end panel and the second sub panel to rotate about a longitudinal axis, each bread guard having at least one cross member, each cross member being attached to the bread guard arm spaced apart from a first end of the cross member and at a point along the longitudinal axis of the bread guard arm, and the bread guard being operable responsive to a force applied to the arm to rotate a first direction about the longitudinal axis so that one of the cross members contacts a portion of the adjacent side panel and thereby applies a force to the cross member that causes the arm to bow placing the bread guard in an inward position, and the bread guard being operable when the applied force is removed to rotate a second direction about the longitudinal axis to an outward position responsive solely to a return force generated by the bowed bread guard arm.

17. The assembly of claim 16 wherein the bread guard arm comprises a rod having the longitudinal axis and having first and second portions, the second portion being shorter than the first portion and being bent so that its longitudinal axis is approximately perpendicular to the longitudinal axis of the first portion.

18. The assembly of claim 17 wherein the heating appliance further comprises a bread carriage that applies the force directly to the second portion of the bread guard arm.

19. The assembly of claim 16 wherein the resilient bread guard arm comprises a resilient metal rod.

20. The assembly of claim 16 wherein each side panel comprises a horizontal tab formed to contact the cross member of the corresponding bread guard.

21. The bread guard of claim 16 wherein each bread guard comprises four cross members, each cross member having top and bottom ends, the resilient bread guard arm being attached to the cross members spaced apart from the bottom ends and the bread guard further comprising a top arm attached to the cross members spaced apart from the top ends.

22. A heating appliance, comprising:

a shell comprising first and second side panels and front and rear end panels, the front end panel having first and second sub panels and each sub panel having a vertical edge, the vertical edges of the first and second sub panels being spaced apart to form an opening, and each sub panel including an aperture extending to the corresponding vertical edge;

a first side heating element attached on the inside of the first side panel and including a terminal extending through the aperture in the first sub panel, the first side heating element operable responsive to a power signal being applied on the terminal to generate heat;

a second side heating element attached on the inside of the second side panel and including a terminal extending through the aperture in the second sub panel, the second side heating element operable responsive to a power signal being applied on the terminal to generate heat;

a first bread guard comprising a resilient bread guard arm mounted adjacent the first side panel between the rear end panel and the first sub panel to rotate about a longitudinal axis, and a second bread guard comprising a resilient bread guard arm mounted adjacent the second side panel between the rear end panel and the second sub panel to rotate about a longitudinal axis, each bread guard having at least one cross member, each cross member being attached to the bread guard arm spaced apart from a first end of the cross member and at a point along the longitudinal axis of the bread guard arm, and the bread guard being operable responsive to a force applied to the arm to rotate a first direction about the longitudinal axis so that one of the cross members contacts a portion of the adjacent side panel and thereby applies a force to the cross member that causes the arm to bow placing the bread guard in an inward position, and the bread guard being operable when the applied force is removed to rotate a second direction about the longitudinal axis to an outward position responsive solely to a return force generated by the bowed bread guard arm; and an electronic circuit coupled to the terminals of the heating elements, the electronic circuit operable to apply the power signals to the heating elements during a heating cycle of the appliance and to remove the power signal to terminate the heating cycle.

23. The heating appliance of claim 22 wherein the bread guard arm comprises a rod having the longitudinal axis and having first and second portions, the second portion being shorter than the first portion and being bent so that its longitudinal axis is approximately perpendicular to the longitudinal axis of the first portion.

24. The heating appliance of claim 23, further comprising a bread carriage that applies the force directly to the second portion of the bread guard arm.

25. The heating appliance of claim 22, further comprising a third heating element being attached to the second end panel between the first and second heating elements, and third and fourth stationary bread guards attached adjacent respective sides of the third heating element.

26. A method for controlling a bread guard during operation of a heating appliance, the bread guard including a resilient bread guard arm having a longitudinal axis and at least one cross member, each cross member attached to the bread guard arm at a point along the longitudinal axis, the method comprising:

applying an activating force to the bread guard to reposition the bread guard from a first position to a second position, the bread guard arm bowing responsive to the bread guard being moved to the second position;

removing the activating force; and relying solely on a return force generated by the bowed bread guard arm to return the bread guard to the first position after the activating force is removed.

27. The method of claim 26 wherein the first position is an inward position and the second position is an outward position within the heating appliance.

28. The method of claim 26 wherein the applied bias force is applied to at least one of the cross members and transferred from the cross member to the resilient bread guard arm to thereby bow the arm.

* * * * *

UNITED STATES PATENT AND TRADEMARK OFFICE
CERTIFICATE OF CORRECTION

PATENT NO. : 6,104,001                                  Page 1 of 1
DATED      : August 15, 2000
INVENTOR(S) : Peter Huggler It is certified that error appears in the above-identified patent and that said Letters Patent is hereby corrected as shown below:

U.S. PATENT DOCUMENTS,
"5,385,082  1/1995  Huggler" should read -- 5,385,082  1/1995  Huggler et al. --

Column 7,
Line 58, "arm generating the sole" should read -- arm bows to generate the sole --

Column 8,
Line 61, "between the read end" should read -- between the rear end --

Signed and Sealed this

Eighth Day of January, 2002

*Attest:*

*Attesting Officer*

JAMES E. ROGAN
*Director of the United States Patent and Trademark Office*